No. 671,002.   
L. B. ROUGH.  
WALKING PLOW.  
(Application filed Aug. 16, 1900.)

Patented Apr. 2, 1901.

(No Model.)

Fig. 1.

Fig. 2.    Fig. 3.

Witnesses:  
George Oltsch  
Maggie Oltsch

Lewis B. Rough  
Inventor

UNITED STATES PATENT OFFICE.

LEWIS B. ROUGH, OF BUCHANAN, MICHIGAN.

WALKING-PLOW.

SPECIFICATION forming part of Letters Patent No. 671,002, dated April 2, 1901.

Application filed August 16, 1900. Serial No. 27,092. (No model.)

*To all whom it may concern:*

Be it known that I, LEWIS B. ROUGH, a citizen of the United States, residing at Buchanan, in the county of Berrien and State of Michigan, have invented certain new and useful Improvements in Walking-Plows; and I do hereby declare the following to be a full, clear, and exact description of the invention, such as will enable others skilled in the art to which it appertains to make and use the same.

My invention relates to improvements in walking-plows; and its object is to provide for regulating the up-and-down movement of the beam when plowing across uneven ground or at right angles to the rows of a corn-field, whereby the plow is given a steady and even movement and the depth of the furrow is kept uniform.

It consists in mounting upon the beam a depending adjustable hanger carrying horizontal arms, combined with the axle of the ground-wheels, and means for limiting the rotary movement of the axle.

Referring to the drawings forming a part of this specification, Figure 1 is a side elevation of the improvement applied to the plow-beam. Fig. 2 is a horizontal section on the line $x$ $x$ of Fig. 1, and Fig. 3 is a detail perspective of the hooked clamp.

Like numerals of reference indicate corresponding parts throughout the several views.

The plow-beam 1 may be of the usual construction, and depending from this beam is the hanger 2, pivoted at one end and secured at the other end by a bolt and nut 3. The hanger is provided with a longitudinal curved slot 4, so that when the binding-nut 3 is released it can be adjusted vertically.

Secured to each side of the hanger, at its lower end, are outwardly-curved horizontal arms 5 and 6, the free ends of which form journals for the axle 7. The arms 5 and 6 are longitudinally adjustable by means of a slot 8 when the binding-nut 9 is released. This permits the ground-wheels to be thrown nearer to or farther from the plow.

The axle 7 is bent in the form of a crank, one end being bent forward, as at 10, while the other end is bent rearward and parallel to the forward end. To the ends of these right-angular portions are journaled the ground-wheels 11 and 12.

Secured to the axle 7 is a clamp 13, one member of which is formed with a hooked extension 14, and which hook engages the upper edge of the arm 6 and prevents lateral movement of the axle when a side thrust or lurch is imparted to the ground-wheels. The axle has a slight rotary movement, caused by the rising and falling of the wheels 11 and 12; but this movement is very slight, as the wheels 11 and 12 are intended to be kept in a certain relation with each other, so as to keep the beam steady. This hook also limits the rotary movement of the axle, it being so constructed and attached to the axle that when the axle is rotated the lower edge 15 of the hook contacts with the edge of the arm 6, and thus acts as a stop for the axle; but when the wheels are moving over level ground and parallel to each other the edge 15 of the hook is free, but its end is in lateral engagement with the side of the arm 6. The rotary and lateral movement of the axle, however, can be regulated by adjusting the clamp up and down or back and forth upon the same. It will be understood that the wheels are spaced apart half the distance of the rows, so that when the forward ground-wheel is on the crest of the ridge the rear ground-wheel will be in the hollow and when the forward wheel is ascending a hill the rear wheel will be descending the corresponding slope. Thus the plow will be caused to have a steady and even movement and plow a furrow of uniform depth.

While this is particularly adapted for walking-plows, it may be applied to any other kind without departing from the spirit of the invention.

Having thus described my invention, what I claim is—

1. In an attachment for plows, a vertically-adjustable hanger carrying horizontally-adjustable arms, combined with an axle journaled in the arms and carrying ground-wheels, and means for limiting the rotary and lateral movement of the axle, substantially as described.

2. In an attachment for plows, a U-shaped hanger having pivotal connection at one end with the beam and adjustable connection at its other end, combined with horizontal arms secured to the lower end of the hanger and upon either side thereof, and capable of longitudinal adjustment, a crank-shaped axle carrying ground-wheels journaled in the free ends of the arms, and provided with means for limiting its lateral and rotary movement, substantially as described.

3. In an attachment for plows, a depending hanger carrying horizontally-adjustable arms, combined with a cranked axle journaled in the free ends of the arms, ground-wheels, a clamp secured to the axle and provided with a hooked extension, said hook adapted to engage one of the arms and limit both the rotary and lateral movement of the axle, substantially as described.

4. In an attachment for plows, a beam, and a U-shaped hanger adjustable on the beam, combined with horizontally-adjustable arms secured to the hanger, a right-angular bent axle journaled in the arms and carrying ground-wheels, a clamp adjustably secured to the axle, one member of which is formed into a hook adapted to engage one of the arms and hold the axle against lateral movement, substantially as described.

In testimony whereof I affix my signature in presence of two witnesses.

LEWIS B. ROUGH.

Witnesses:
JOHN C. DICK,
B. HINCHMAN.